United States Patent [19]

Kassai

[11] Patent Number: 4,845,805
[45] Date of Patent: Jul. 11, 1989

[54] CASTER

[75] Inventor: Kenzou Kassai, Osaka, Japan

[73] Assignee: Aprica Kassai Kabushikikaisha, Osaka, Japan

[21] Appl. No.: 90,656

[22] Filed: Aug. 28, 1987

[30] Foreign Application Priority Data

Oct. 6, 1986 [JP] Japan ................. 61-237620
Nov. 17, 1986 [JP] Japan ................. 61-176343

[51] Int. Cl.⁴ ............................................. B60B 33/00
[52] U.S. Cl. ..................................... 16/35 R; 16/44; 188/1.12
[58] Field of Search ............... 16/35 R, 44; 118/1.12

[56] References Cited

U.S. PATENT DOCUMENTS

| 3,636,586 | 1/1972 | Bollinger et al. | 16/35 R |
| 4,037,291 | 7/1977 | Huemfner et al. | 16/35 R |
| 4,453,287 | 6/1984 | Kassai | 16/35 R |
| 4,494,272 | 1/1985 | Morita | 16/35 R |
| 4,543,685 | 10/1985 | Kassai | 16/35 R |
| 4,570,288 | 2/1986 | Kassai | 16/35 R |
| 4,637,093 | 1/1987 | Kassai | 16/35 R |
| 4,684,148 | 8/1987 | Glaser | |

FOREIGN PATENT DOCUMENTS

| 0023432 | 2/1981 | European Pat. Off. | |
| 2489215 | 3/1982 | France | |
| 58-218402 | 12/1983 | Japan | 16/35 R |
| 971199 | 9/1964 | United Kingdom | |

Primary Examiner—Nicholas P. Godici
Assistant Examiner—J. Reed Batten, Jr.
Attorney, Agent, or Firm—W. G. Fasse; D. H. Kane, Jr.

[57] ABSTRACT

A caster has a fixed bracket (15), a rotary yoke (16) rotatably supported on the fixed bracket (15), and a wheel (2) rotatably supported on the rotary yoke (16) by a horizontal axle (16). The axle (16) is mounted for movement in a predetermined range in a horizontal plane in a direction which is at right angles to the axle. The rotary yoke (16) includes an automatic locking member (17) capable of moving between first and second positions in response to the movement of the horizontal axle. The fixed bracket (15) is provided with an engaging recess (36) for engaging the automatic locking member (17) to inhibit the rotation of the rotary yoke (16) when the fixed bracket (15) and the rotary yoke (16) are in a predetermined positional relationship and when the automatic locking member (17) is in the first position.

9 Claims, 12 Drawing Sheets

PRIOR ART

CASTER

FIELD OF THE INVENTION

This invention relates to a caster attached to an object to be moved to make it easy for said object to change the direction of its travel.

BACKGROUND INFORMATION

To make it easy to change direction of travel, casters are sometimes attached to transport devices such as baby carriages or to objects to be moved.

FIG. 1 is a diagrammatic view of a baby carriage having a push rod that can be switched between a back-to-face push mode and a face-to-face push mode. The front wheels of the carriage are provided with casters to permit a swiveling motion. The illustrated baby carriage 1 comprises a pair of front legs disposed on opposite sides and rotatably supporting front wheels 2 secured to the lower ends of the front legs by axles 6, a pair of rear legs 5 disposed on opposite sides and rotatably supported rear wheels 4 secured to the lower ends of the rear legs by axles 7, and a push rod 10. The push rod 10 is tiltably installed so that it can be switched between a back-to face push mode and a face-to-face push mode. The position of the push rod 10 shown by a solid line in FIG. 1 corresponds to the back-to-face push mode, and the position of the push rod 10 shown by a phantom line corresponds to the face-to-face push mode.

Casters 8 are attached to the lower ends of the pair of front legs 3. Each caster 8 is turnable around a rotational axis 9 and rotatably supports the respective front wheel 2 by the horizontal axle 6 at a position horizontally spaced from the rotational axis 9.

In the case where the baby carriage 1 is operated for travel on a smooth surface road in the back-to-face push mode, the axles of the front wheels 2 are positioned rearwardly of the rotational axes 9 of the casters 8 as viewed in the direction of travel. When the direction of travel of the baby carriage 1 is changed, the casters 8 suitably swivel to facilitate the change of the direction of travel. Thus, the provision of casters 8 on the baby carriage 1 improves its in operability.

The manner of switching the push rod 10 from the solid line state shown in FIG. 1 to the face-to-face push mode to operate the baby carriage 1 for travel in this mode will now be described. When the push rod 10 is switched to the face-to-face push mode as shown by the phantom line in FIG. 1 and the baby carriage is operated for travel in this mode, the casters 8 swivel through 180 degrees until the front wheels 2 assume the phantom line position. In this state, the axles 6 of the front wheels 2 are positioned rearwardly of the rotational axes 9 of the casters 8 as viewed in the direction of travel. On the other hand, the rear wheels 4 positioned forward as viewed in the direction of travel cannot swivel. Therefore, when the baby carriage 1 is operated for travel in a face-to-face push mode, the direction of travel cannot be changed so easily.

Most of the baby carriages now on the market have the construction shown in FIG. 1. In other words, when the baby carriage is operated for travel in the back-to-face push mode, the casters act effectively, allowing a smooth change of direction of travel, but when the push rod is switched to the face-to-face push mode, the rear wheels which are now positioned forward as viewed in the direction of travel cannot swivel, so that the direction of travel cannot be changed smoothly.

To solve, this problem, both of the front and rear wheels could be provided with the function of a caster. FIGS. 2 and 3 are diagrammatic views showing a baby carriage 1 with a push rod 10 that can be switched between a back-to-face push mode and a face-to-face push mode and the front and rear wheels 2 and 4 of which are both swivelable by casters 8 and 11. In FIG. 2, the push rod 10 is in the back-to-face push mode, while in FIG. 3 it is in the face-to-face push mode. Each front wheel 2 is supported by a caster 8 which is swivelable around a rotational axis 9, while rear wheel 4 is supported by a caster 11 which is swivelable around a rotational axis 12.

When the baby carriage 1 is operated for travel in the back-to-face push mode as shown in FIG. 2, the axles 6 of the front wheels 2 are positioned rearwardly of the rotational axes 9 of the casters 8 as viewed in the direction of travel. Likewise, the axles 7 of the rear wheels 4 are also positioned rearwardly of the rotational axes 12 of the casters 11 as viewed in the direction of travel.

When the push rod 10 is switched from the state shown in FIG. 2 to the face-to-face push mode and the baby carriage is operated for travel in this mode, as shown in FIG. 3, the casters 8 and 11 are turned through 180°. Therefore, as shown in FIG. 3, the axles 6 of the front wheels 2 are positioned rearwardly of the rotational axes 9 of the casters 8 as viewed in the direction of travel, and the axles 7 of the rear wheels 4 are positioned rearwardly of the rotational axes 12 of the casters 11 as viewed in the direction of travel.

Any baby carriage of the construction shown in FIGS. 2 and 3 has a better operability than the baby carriage of the construction shown in FIG. 1 because in FIGS. 2 and 3 both the front and rear wheels 2 and 4 are swivellable by the casters 8 and 11, whereas in FIG. 1 only casters 8 are provided.

Even the baby carriage shown in FIGS. 2 and 3, however, has problems, because by permitting the front and rear wheels to swivel, these wheels become too sensitive to the unevenness of a rough road surface. Referring to FIG. 4, when the baby carriage is to be moved straight as shown by a solid line A, it responds to the unevenness of the road surface with such a sensitivity that the path of travel of the baby carriage 1 becomes zigzag as indicated by a dotted line B. Referring to FIG. 5, when the baby carriage is to travel along a curved path as indicated by a solid line C, the wheels also respond to the unevenness of the road surface with such a sensitivity that its path of travel becomes zigzag as indicated by a dotted line D.

To operate the baby carriage for travel in a stabilized manner, the zigzag movement described above must be avoided. To this end, it is necessary to provide means for inhibiting the swiveling of the wheels which are positioned rearward as viewed in the direction of travel.

SUMMARY OF THE INVENTION

Accordingly, it is an object of the invention to provide a caster constructed so that it is brought into its locked state which automatically inhibits any swiveling when it is in a predetermined positional relationship. For example, if such casters are attached to the baby carriage shown in FIGS. 2 and 3, the casters positioned rearward, as viewed in the direction of travel, are automatically locked to be inhibited from swiveling while the casters positioned forward, as viewed in the direction of travel, are allowed to swivel.

In a first aspect of the invention, a caster comprises a fixed bracket rigidly attached to an object to be moved on said caster, a rotary yoke supported on said fixed bracket for rotation around a vertical axis, and a wheel rotatably supported on said rotary yoke by a horizontal axle. The horizontal axle is adapted to move in a predetermined range in a horizontal plane in a direction which is at a right angle to said horizontal axle. The rotary yoke includes an automatic locking member adapted to move between first and second positions in response to the movement of the horizontal axle. The fixed bracket is provided with rotation inhibiting means for engaging the automatic locking member or rotary yoke to inhibit the rotation of the rotary yoke when said fixed bracket and said rotary yoke are in a predetermined positional relationship relative to each other and when the automatic locking member is in the first position.

A caster according to a second aspect of the invention includes, in addition to the aforesaid structural features, the following features. That is, the rotary yoke includes, in addition to said automatic locking member, a manual locking member adapted to be switched between two positions by hand or by foot and, when in one position, to engage the fixed bracket for inhibiting the rotation of said rotary yoke.

A caster according to a third aspect of the invention includes the following additional features. That is, the rotary yoke includes, in addition to the automatic locking member, a brake member adapted to be switched between two positions being operated by hand or by foot. In one of the two positions, the brake member engages the wheel for inhibiting the rotation of said wheel.

A caster according to a fourth aspect of the invention includes, in addition to the rotary yoke including the automatic locking member, a manual locking member adapted to be switched between two positions by being operated by hand or by foot and. In one position the manual locking engages the fixed bracket for inhibiting the rotation of said rotary yoke, and a brake member also arranged for switching between two positions by being operated by hand or by foot. In one position the brake member engages the wheel for inhibiting the rotation of said wheel.

The caster according to a fifth embodiment of the invention comprises a fixed bracket rigidly attached to an object to be moved on said caster, a rotary yoke supported on said fixed bracket for rotation around a vertical axis, and a wheel rotatably supported on said rotary yoke by a horizontal axle. The rotary yoke includes an automatic locking member tiltably attached at its lower portion by an axle extending centrally through the automatic locking member for displacement between first and second positions.

The rotary yoke has a elongated opening extending horizontally in a direction at right angles to the axle. The axle is held in said elongated opening and horizontally movable therein.

The fixed bracket has a recess adapted for engaging the upper portion of the automatic locking member for inhibiting the rotation of the rotary yoke when the fixed bracket and rotary yoke are in predetermined positional relationship relative to each other.

The functions and merits of casters according to the invention will now be described using FIGS. 2 and 3 for comparing. Suppose that casters according to the invention are employed as the casters 8 and 11 for supporting the front and rear wheels 2 and 4, respectively. Since the casters 8 and 11 function in the same manner, the operation of only the casters 11 will be described.

The axle 7 of each wheel 4 is movable in a predetermined range in a horizontal plane in a direction at a right angle to said axle 7. Therefore, when the baby carriage 1 is operated for travel in a back-to-face push mode as shown in FIG. 2, the rear wheel 7 is positioned relatively remote from the rotational axis 12. The automatic locking member is movable between the first and second positions in response to the movement of the axle 7. More specifically, when the axle 7 is positioned relatively remote from the rotational axis 12 of the caster 11, the automatic locking member is in the first position. On the other hand, when the axle 7 is positioned relatively closer to the rotational axis 12, the automatic locking member is in the second position. The rotation inhibiting means provided on the fixed bracket is adapted to engage the automatic locking member or rotary yoke to inhibit the rotation of the rotary yoke when the fixed bracket and rotary yoke are in a predetermined positional relationship relative to each other and when the automatic locking member is in the first position. Specifically, when the rear wheel 4 is positioned rearward as viewed in the direction of travel and when the axle 7 is positioned relatively remote from the rotational axis 12 of the caster 11, the rotation of the rotary yoke is inhibited. In the state shown in FIG. 2, therefore, the caster 11 is in the locked state, inhibiting the swiveling of the rear wheel 4. On the other hand, the caster 8 is not locked, allowing the front wheel 2 to swivel. Thus, when the baby carriage 1 is operated for travel in a back-to-face push mode as shown in FIG. 2, only the front wheel 2 positioned forward as viewed in the direction of travel, is allowed to swivel, while the rear wheel 4 is inhibited from swiveling.

Then, suppose that the push rod 10 is turned from the state shown in FIG. 2 to the face-to-face push mode, and that the baby carriage 1 is slightly moved forward. Since the caster 8 is not locked, this movement causes the front wheel 2 to turn through 180° until the axle 6 is positioned rearwardly of the rotational axis 9 of the caster 8. On the other hand, since the caster 11 for the rear wheel 4 has been locked, it does not swivel even when this movement of the baby carriage takes place. Therefore, the axle 7 of the rear wheel 4 moves to a position relatively close to the rotational axis 12 of the caster 11. This movement of the axle 7 causes the automatic locking member to move from the first to the second position. When the automatic locking member is in the second position, its locked state due to the rotation inhibiting means, is canceled, thus allowing the rotary yoke to rotate. Therefore, the caster 11 for the rear wheel 4 swivels through 180°, with the result that the axle 7 of the rear wheel 4 is positioned rearwardly of the rotational axis 12 of the caster 11 as viewed in the direction of travel. This state is shown in FIG. 3.

In the face-to-face push mode shown in FIG. 3, the caster 11 positioned forward as viewed in the direction of travel, is allowed to swivel, while the caster 8 positioned rearward as viewed in the direction of travel, is locked, so that the swiveling of the front wheel 2 is inhibited. Therefore, even when the baby carriage 1 is operated for travel in the face-to-face push mode, only the rear wheel 4 which is now positioned forward as viewed in the direction of travel is allowed to swivel.

As described above, in the case where casters according to the invention are attached to the front and rear legs of a baby carriage which can be switched between two modes, i.e., the back-to-face and the face-to-face push modes, the casters which are positioned rearward as viewed in the direction of travel, are automatically locked. Therefore, it is possible to operate the baby carriage in a stabilized manner.

In the caster according to the second aspect of the invention, the rotary yoke includes a manual locking member in addition to the automatic locking member. When the baby carriage is operated for travel on a flat road, it is preferably that the casters which are positioned forward as viewed in the direction of travel, be allowed to swivel. However, when the baby carriage is operated for travel on a bad road with a noticeable unevenness, the swiveling function of the casters will aggravate the operability of the baby carriage. In such case, the need arises for locking those casters as well which are positioned forward, as viewed in the direction of travel. The manual locking member acts effectively where there is such need.

Since the rotary yoke of the caster according to the third embodiments of the invention includes the automatic locking member and a brake member which inhibits the rotation of the wheel, there is no need to provide a baby carriage with a mechanism for inhibiting the rotation of the wheel, when casters of this third embodiment are attached to the baby carriage.

Where the caster of the invention comprises the rotary yoke with a manual locking member, a brake member, and an automatic locking member, the caster becomes even more versatile Although examples of casters being attached to baby carriages have been given above, the casters of the invention are applied not only to baby carriages but also to other movable objects such as load carrying vehicles.

DESCRIPTION OF THE PREFERRED EMBODIMENTS AND OF THE BEST MODE OF THE INVENTION

Figure 6:
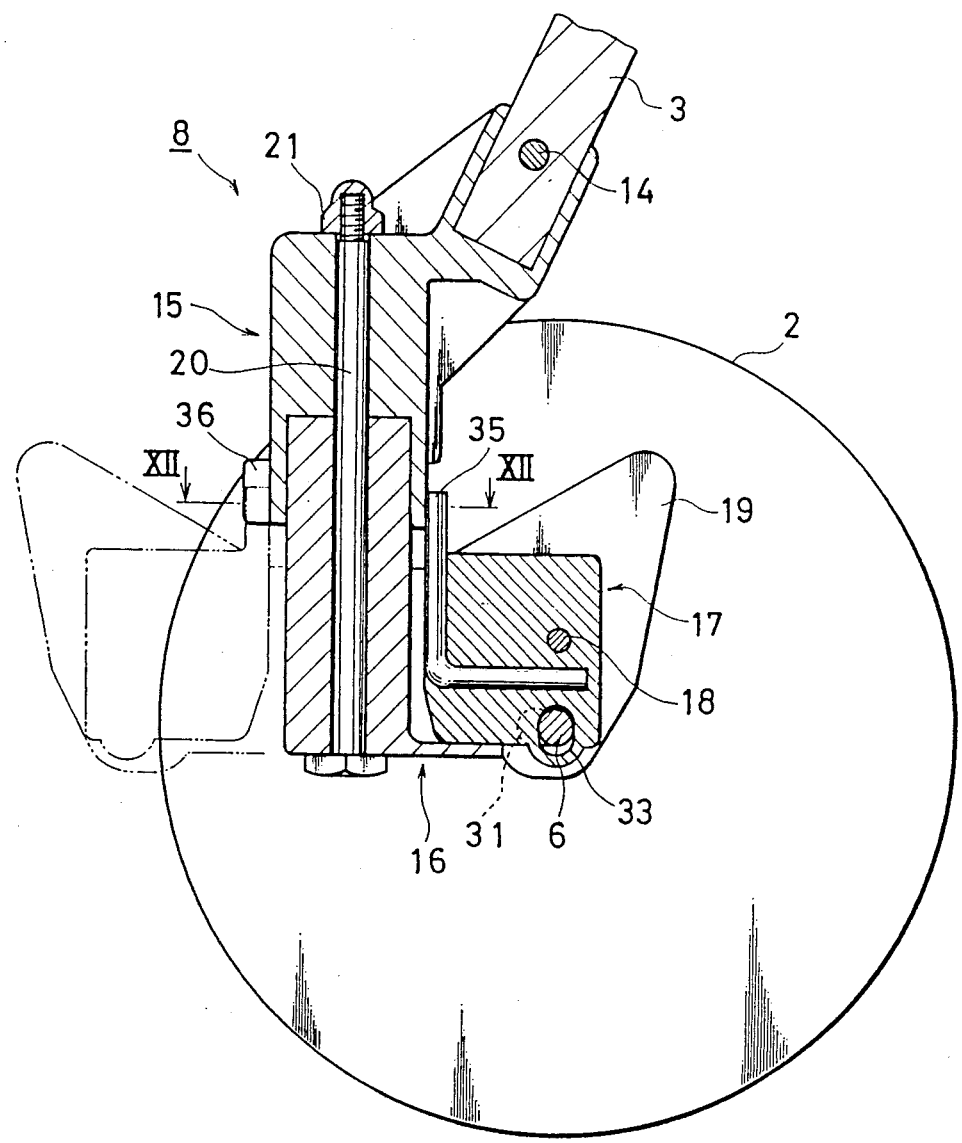
FIG. 6 is a front view, in section, of a caster according to the invention attached to a front leg of a baby carriage.
Figure 7:
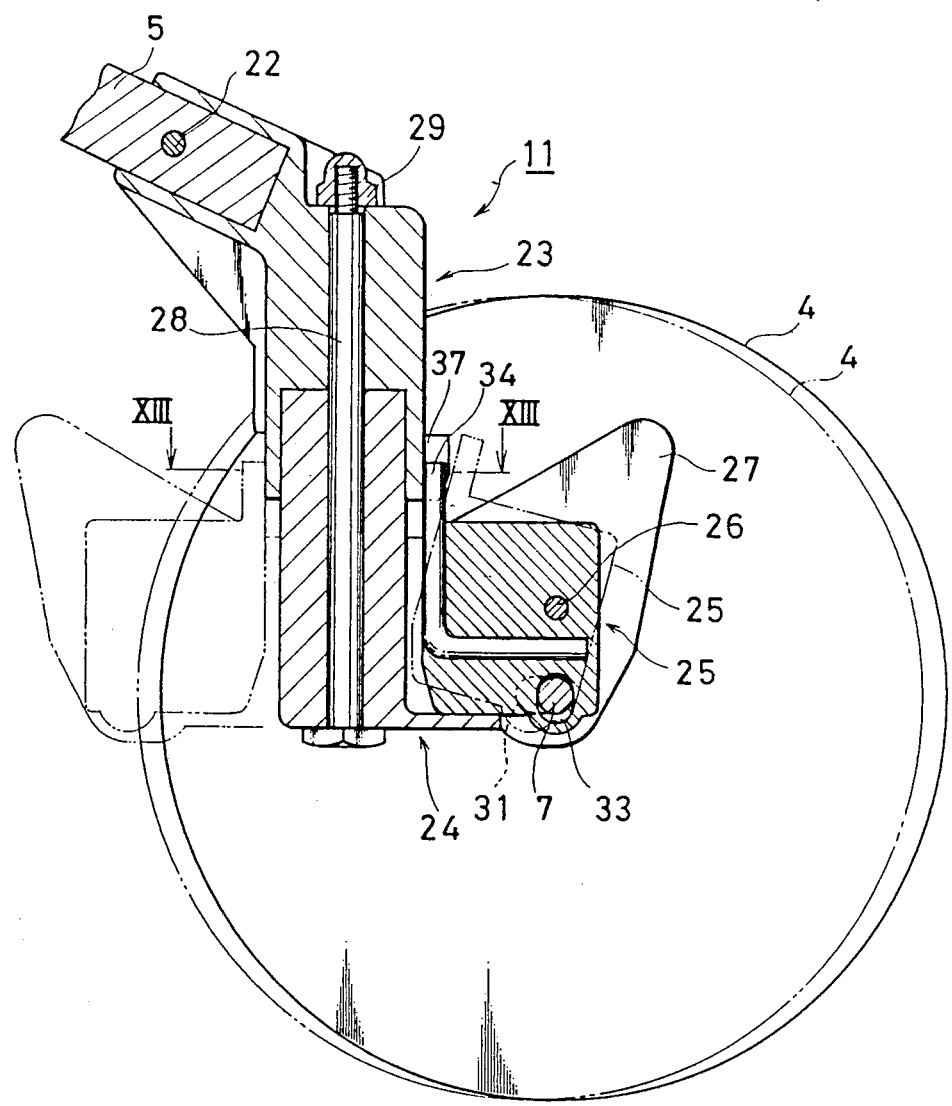
FIG. 7 is a front view, in section, of a caster according to the invention attached to a rear leg of a baby carriage.

FIG. 6 is a front view, in section, of a caster according to the invention attached to a front leg of a baby carriage, and FIG. 7 is a front view, in section, of a caster according to the invention attached to a rear leg of a baby carriage.

First, reference is made to FIG. 6. A caster 8 comprises a fixed bracket 15 rigidly attached at its upper end to a front leg 3 of a baby carriage by a pin 14, a rotary yoke 16 rotatably supported by said fixed bracket 15, and a wheel 2 rotatably supported on the rotary yoke 16, by a horizontal axle 6. The rotary yoke 16 has a pair of projecting walls 19 extending rearward. An automatic locking member 17 is turnably installed between said pair of projecting walls 19 by a journal pin 18. A support shaft 20 extends vertically through the rotary yoke 16 and fixed bracket 15. A nut 21 is threadedly attached to the upper end of said support shaft 20 for preventing the support shaft 20 from slipping off. Thus, the rotary yoke 16, held on the support shaft 20, is allowed to rotate or swivel relative to the fixed bracket 15.

Next, reference is made to FIG. 7. A caster 11 shown in FIG. 7 comprises a fixed bracket 23 rigidly attached at its upper end to a rear leg 5 of a baby carriage by a pin 22, a rotary yoke 24 rotatably supported by said fixed bracket 23, and a wheel 4 rotatably supported on the rotary yoke 24 by a horizontal axle 7. The rotary yoke 24 has a pair of projecting walls 27 and an automatic locking member 25 is pivotally installed between said pair of projecting walls 27 by a journal pin 26. A support shaft 28, like the support shaft 20 shown in FIG. 65, extends vertically through the rotary yoke 24 and a fixed bracket 23 and a nut 29 are threadedly attached to the upper end of said support shaft 28.

Figure 8:
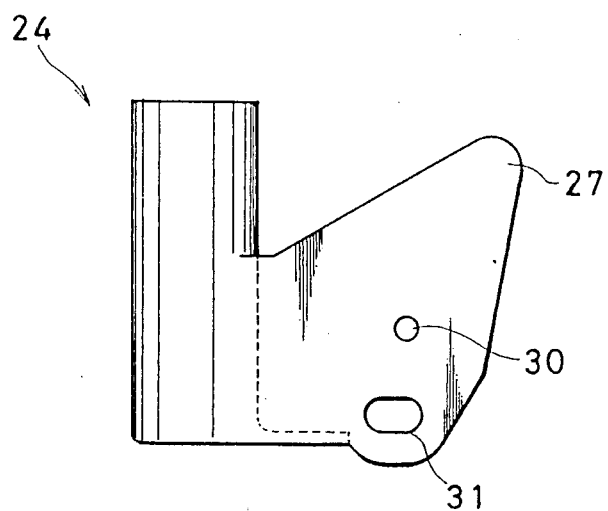
FIG. 8 is a front view of a rotary yoke 24 shown in FIG. 7.
Figure 9:
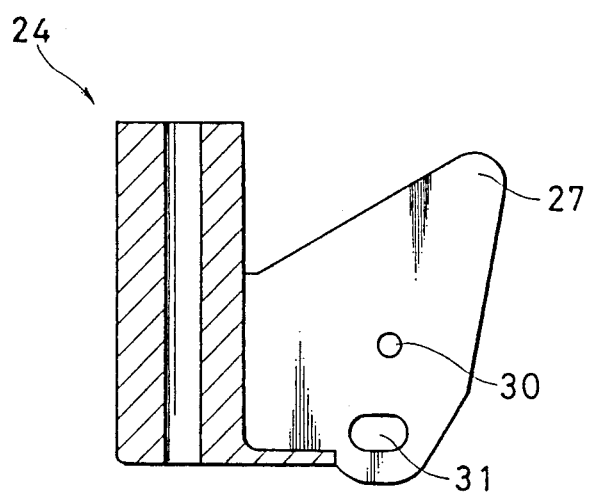
FIG. 9 is a front view, in section, of the rotary yoke 24.

FIGS. 8 and 9 show the rotary yoke 24. Each of the pair of projecting walls 27 is formed with a round through-hole 30 for receiving the journal pin 26 shown in FIG. 7. Further, as shown, each of the pair of projecting walls 27 has an elongated opening 31 extending horizontally toward the rotational axis of the rotary yoke 24.

Figure 10:
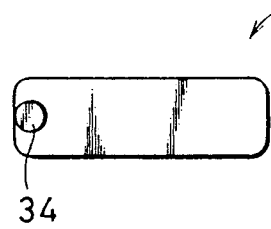
FIG. 10 is a plan view of an automatic locking member 25 shown in FIG. 7.
Figure 11:
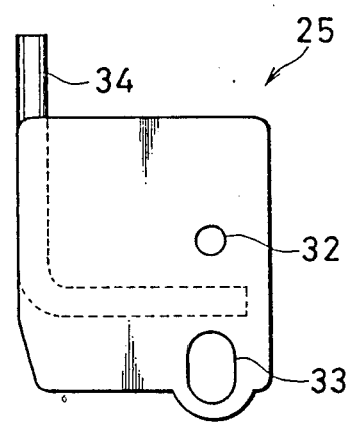
FIG. 11 is a front view of the automatic locking member 25.

FIGS. 10 and 11 shown the automatic locking member 25. A round hole 32 shown in FIG. 11 receives the journal pin 26 shown in FIG. 7. Further, as shown, the automatic locking member 25 has a vertical elongated opening 33. The automatic locking member 25 has an L-shaped rod 34 integral therewith.

The rotary yoke 16 and automatic locking member 17 shown in FIG. 6 are of the same configuration as those shown in FIGS. 8 to 11. That is, the automatic locking member 17 has an L-shaped rod 35 integral therewith. Further, the automatic locking member 17 has a vertical elongated opening 33, and each of the pair of projecting walls 17 has an elongated opening 31 which extends horizontally toward the rotational axis of the rotary yoke 16.

Referring to FIG. 7, the axle 7 of the rear wheel 4 extends through the elongated openings 31 formed in the pair of projecting walls 27 and the elongated opening 33 in the automatic locking member 25. Therefore, the axle 7 is horizontally movable toward the rotational axis of the rotary yoke 24. In the state shown in FIG. 7, the axle 7 is positioned relatively remote from the rotational axis of the rotary yoke 24. When the axle 7 is horizontally moved to a position which is relatively close to the rotational axis of the rotary yoke 24, the automatic licking member 25 is turned around the axis of the pin 26. The state established after the automatic locking member 25 has turned is shown in phantom lines.

In the state shown in FIG. 6 the axle 6 of the front wheel 2 is also positioned relatively remote from the rotational axis 16. When the axle 6 is moved from this state to a position relatively close to the rotational axis of the rotary yoke 16, the automatic locking member 17 is turned clockwise from the illustrated state.

Figure 12:
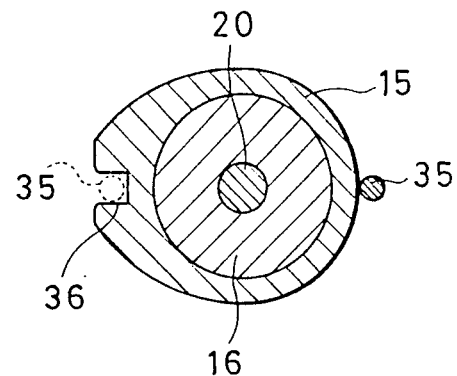
FIG. 12 is an end view taken along the line XII—XII in FIG. 6.
Figure 13:
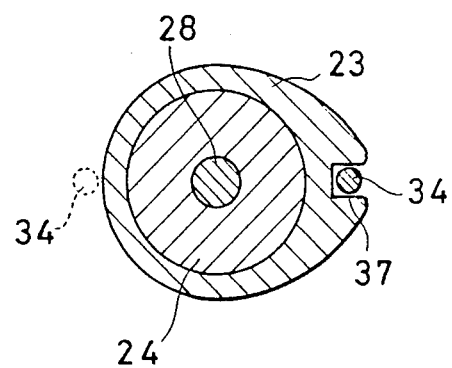
FIG. 13 is an end view taken along the line XIII—XIII in FIG. 7.

FIG. 12 is an end view taken along the line XII—XII in FIG. 6, and FIG. 13 is an end view taken along the line XIII—XIII in FIG. 7. As illustrated, the fixed bracket 15 attached to the front leg 3 of the baby carriage has an engaging recess 36 in its front portion is adapted to receive the rod 35 of the automatic locking member 17. On the other hand, the fixed bracket 23 attached to the rear leg 5 of the baby carriage has an engaging recess 37 in its rear portion adapted to receive the rod 34 of the automatic locking member 25. The rod 34 moves on the outer surface of the fixed bracket 23 as the rotary yoke 24 is turned. Further, the outer surfaces of the fixed brackets 15 and 23 are smoothly curved so as not to interfere with the movement of the rods 35 and 34, respectively.

The function of the casters 8 and 11 will now be described with reference to FIGS. 6, 7, 2 and 3.

Figure 1:
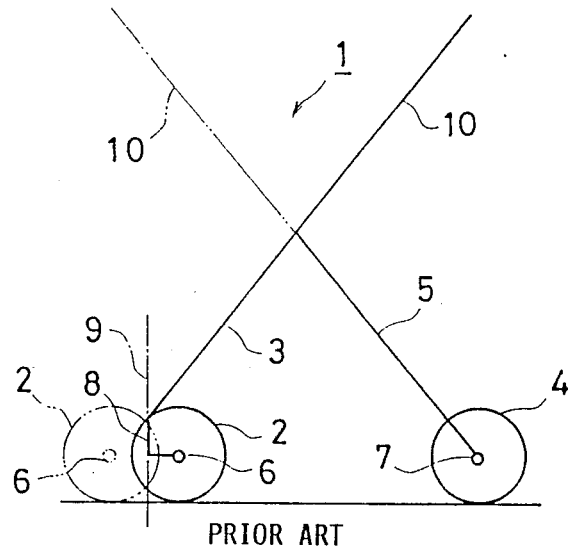
FIG. 1 is a diagrammatic view showing a conventional baby carriage having a push rod that can be switched between two states, i.e., a back-to-face push mode and a face-to-face push mode and which has casters attached to the lower ends of its front legs.
Figure 2:
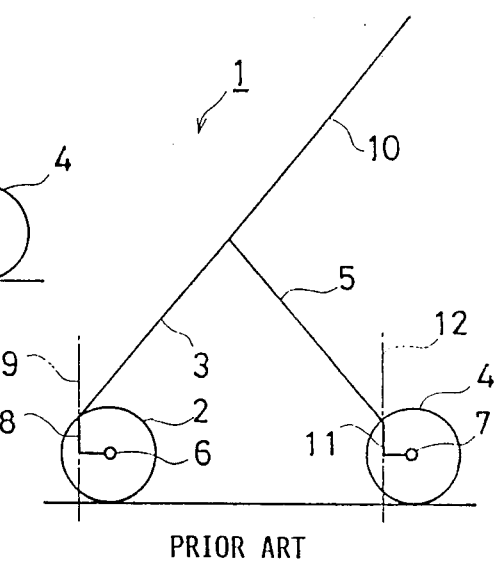
FIG. 2 is a diagrammatic view showing a conventional baby carriage having a push rod that can be switched between two states, i.e., a back-to-face push mode and a face-to-face push mode and which has casters attached to the lower ends of its front and rear legs.

Suppose that the baby carriage 1 is being operated for travel in a back-to-face push mode as shown in FIG. 2. In this case, the axles 6 and 7 of the front and rear wheels 2 and 4 are positioned relatively remote from the rotational axes of the rotary yokes, respectively. The rod 35 of the automatic locking member 17 of the caster 8 for the front wheel 2 is positioned on the smooth outer curved surface of the fixed bracket 15, as shown in FIG. 12. Therefore, the caster 8 for the front wheel 2 is allowed to swivel. On the other hand, the rod 34 of the automatic locking member 25 for the caster 11 for the rear wheel 4 is engaged in the engaging recess 37 of the fixed bracket 23. As a result, the caster 11 is in the locked state and inhibited from swiveling.

Thus, it is seen that when the baby carriage 1 is operated for travel in the back-to-face push mode as shown in FIG. 2, the caster 8 for the front wheel 2 is allowed to swivel but that the caster 11 for the rear wheel 4 is inhibited from swiveling. Therefore, the baby carriage 1 can travel in a stabilized manner.

Suppose that the push rod 10 is switched to a face-to-face push mode and that the baby carriage is slightly moved forward. This movement causes the caster 8 for the front wheel 2 to swivel through 180° until the axle 6 of the front wheel 2 is positioned rearwardly of the rotational axis 9 of the caster 8.

On the other hand, since the caster 11 for the rear wheel 4 has been locked, it cannot swivel during the initial stage of the slight forward movement of the baby carriage 1. Thus, referring to FIG. 7, the axle 7 of the rear wheel 4 is moved horizontally to a position relatively close to the rotational axis of the rotary yoke 24. This movement of the axle 7 causes the automatic locking member 25 to turn clockwise as shown in phantom lines whereby the engagement between the rod 34 of the automatic locking member 25 and the recess 37 of the fixed bracket 23 is canceled whereby the caster 11 now can swivel. As a result, the rotary yoke swivels through 180° until the axle 7 of the rear wheel 4 is positioned rearwardly of the rotational axis 12 of the caster 11 as viewed in the direction of travel. This state is shown in FIG. 3.

Figure 3:
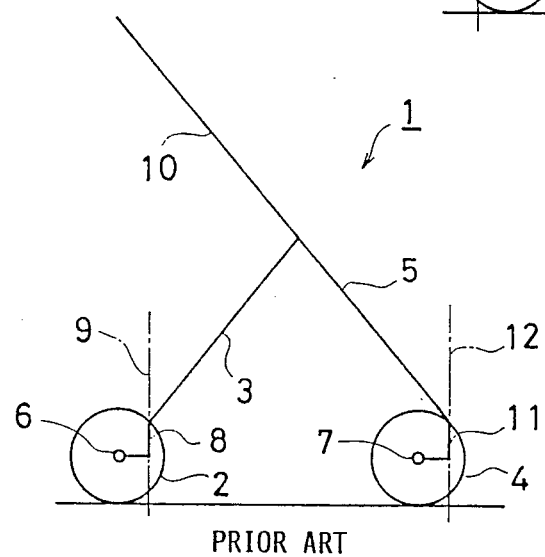
FIG. 3 is a diagrammatic view showing the state established after the push rod has been switched from the state shown in FIG. 2 to the face-to-face push mode.
Figure 4:
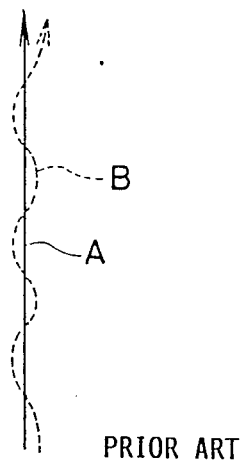
FIG. 4 is a diagrammatic view showing the path of travel of a baby carriage when the baby carriage is moved along a straight path.
Figure 5:
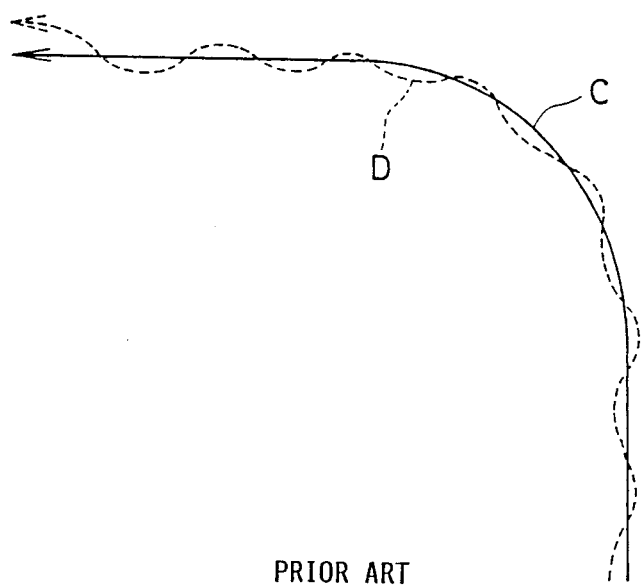
FIG. 5 is a diagrammatic view showing the path of travel of a baby carriage when the baby carriage changes its direction of travel along a curve.

In the state shown in FIG. 3, the rod 34 of the automatic locking member 25 for the rear wheel 4 positioned forward as viewed in the direction of travel lies on the smooth curved outer surface of the fixed bracket 23, as shown in phantom line. Therefore, the caster 11 is allowed to swivel.

On the other hand, the rod 35 of the automatic locking member 17 for the front wheel 2 positioned rearward, as viewed in the direction of travel, fits into the engaging recess 36 of the fixed bracket 15, as shown in dotted line. Therefore, the caster 8 is locked and cannot swivel.

Thus, when the baby carriage 1 is in a face-to-face push mode as shown in FIG. 3, the casters 11 for the rear wheels 4 positioned forward as viewed in the direction of travel are allowed to swivel, while the casters 8 for the front wheels 2 positioned rearward, as viewed in the direction of travel, are automatically locked. Therefore, the baby carriage 1 can travel in a stabilized manner.

The same movement takes place also when the face-to-face push mode shown in FIG. 3 is switched to the back-to-face push mode shown in FIG. 2.

In the above embodiment, engaging recesses 36 and 37 have been employed as rotation inhibiting means for inhibiting the rotation of the rotary yokes. However, other forms may be contemplated. One form will now be described by way of example.

Figure 15:
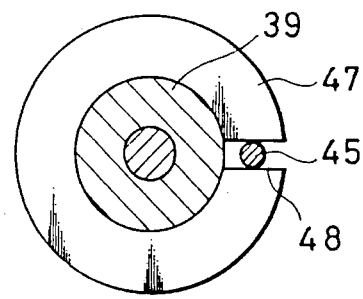
FIG. 15 is a sectional view taken along the line XV—XV in FIG. 14.
Figure 14:
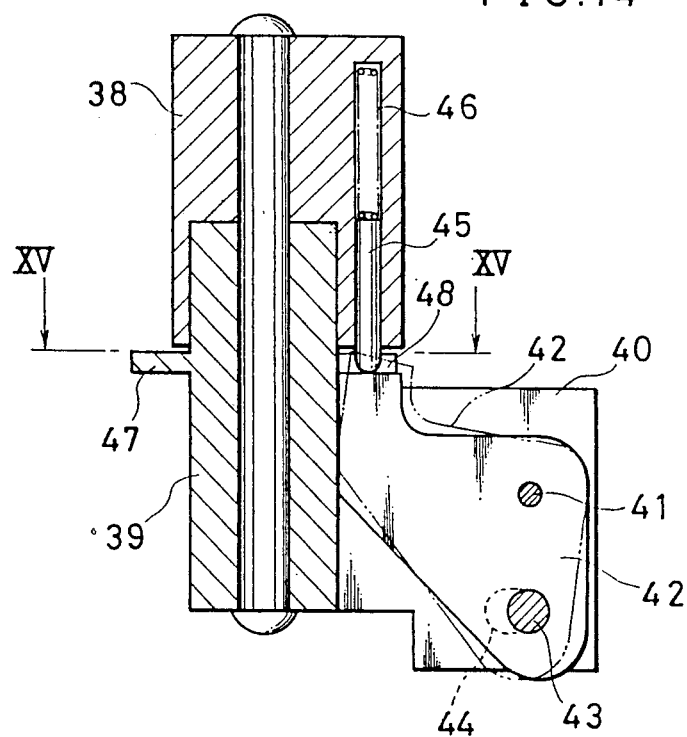
FIG. 14 is a front view, in section, of another embodiment of a caster according to the invention.

First, reference is made to Figs. 14 and 15. The illustrated caster comprises a fixed bracket 38, a rotary yoke 39 rotatably supported by said fixed bracket 38, and an automatic locking member 42. The rotary yoke 39 has a pair of projecting walls 40. The automatic locking member 42 is turnably installed between said pair of projecting walls 40 on a journal pin 41. Further, each of the pair of projecting walls 40 has an elongated opening 44 extending toward the rotational axis of the rotary yoke 39. An axle 43 extends through said elongated openings 44 and through the automatic locking member 42.

As shown, a locking pin 45 is housed in the fixed bracket 38. The locking pin 45 is constantly urged downward by a spring 46. The rotary yoke 39 has a horizontal plate 47 for supporting the lower end of the locking pin 45.

FIG. 15 is a sectional view taken along the line XV—XV in FIG. 14. As shown, the horizontal plate 47 has a slot 48 for receiving the locking pin 45 when the fixed bracket 38 and the rotary yoke 39 come into a predetermined positional relationship relative to each other. The automatic locking member 42 is adapted to lie under the slot 48.

In the state shown in FIGS. 14 and 15, since the locking pin 45 is engaged with the slot 48, the rotary yoke 39 is not allowed to swivel. When the axle 43 is moved from the illustrated state horizontally toward the rotational axis of the rotary yoke 39, the automatic locking member 42 turns clockwise as shown in phantom lines, pushing up the locking pin 45. As a result, the state of engagement between the locking pin 45 and the slot 48 is canceled, thereby allowing the rotary yoke 39 to rotate.

Figure 16:
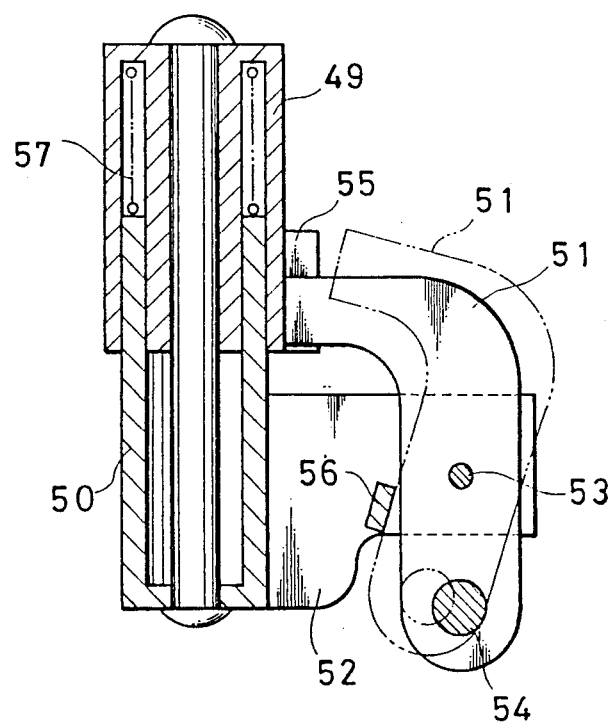
FIG. 16 is a front view, in section, of still another embodiment of a caster according to the invention.

FIG. 16 is a front view, in section, of another embodiment of a caster. The illustrated caster is constructed so that a rotary yoke 50 is rotatably supported by a fixed bracket 49 and is vertically movable relative to the fixed bracket 49. That is, the rotary yoke 50 is constantly urged downward by a spring 57 but is movable upward from the illustrated state against the force of the spring 57. The rotary yoke 50 has a projecting wall 52. An automatic locking member 51 is turnably attached to the projecting wall 52 by a pin 53. An axle 54, in this embodiment, is not supported by the projecting wall 52 but it is directly supported by the automatic locking member 51. When the axle 54 is moved from the illustrated state horizontally toward the rotational axis of the rotary yoke 50, the automatic locking member 51 is turned clockwise as shown in phantom lines, while the rotary yoke 50 is moved upward against the force of the spring 57. A stop 56 is secured on the projecting wall 52 to define the end of the clockwise turning movement of the automatic locking member 51.

Further, as shown, the fixed bracket 49 has an engaging recess 55 engageable by the automatic locking member 51. In the illustrated state, the automatic locking member 51 is engaged in the recess 55, thereby inhibiting the rotation of the rotary yoke 50. When the axle 54 is moved from this state horizontally toward the rotational axis of the rotary yoke 50, the engagement between the automatic locking member 51 and the recess 55 is canceled, thereby allowing the rotary yoke 50 to rotate.

Figure 17:
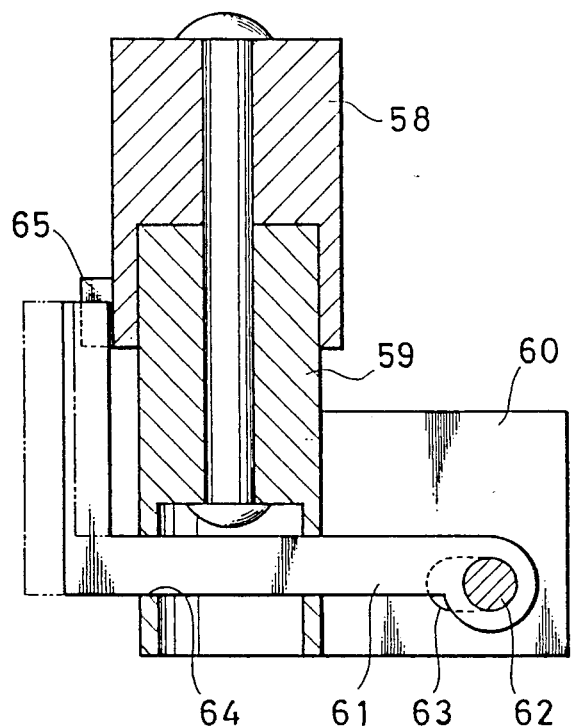
FIG. 17 is a front view, in section, of still another embodiment of a caster according to the invention.

FIG. 17 is a front view, in section, of another embodiment of a caster. In this embodiment, a rotary yoke 59 rotatably held by a fixed bracket 58 has a projecting wall 60 having an elongated opening 63 extending horizontally toward the rotational axis of the rotary yoke 59. An axle 62 extends through the elongated opening 63. An automatic locking member 61 is fixedly attached to the axle 62. The rotary yoke 59 has a through-hole 64 for supporting the horizontally extending automatic locking member 61 so that the latter is horizontally movable. Therefore, the automatic locking member 61 moves horizontally in response to horizontal movement of the axle 62. Further, the fixed bracket 58 has an engaging recess 65 engageable with the automatic locking member 61.

In the illustrated state, the automatic locking member 61 engages the recess 65, thereby inhibiting the rotary yoke 59 from rotating. When the axle 62 is moved form this state horizontally toward the rotational axis of the rotary yoke 59, the automatic locking member 61 is also moved, so that its engagement with the engaging recess 65 is canceled. Therefore, the rotary yoke 59 is now allowed to rotate.

Figure 18:
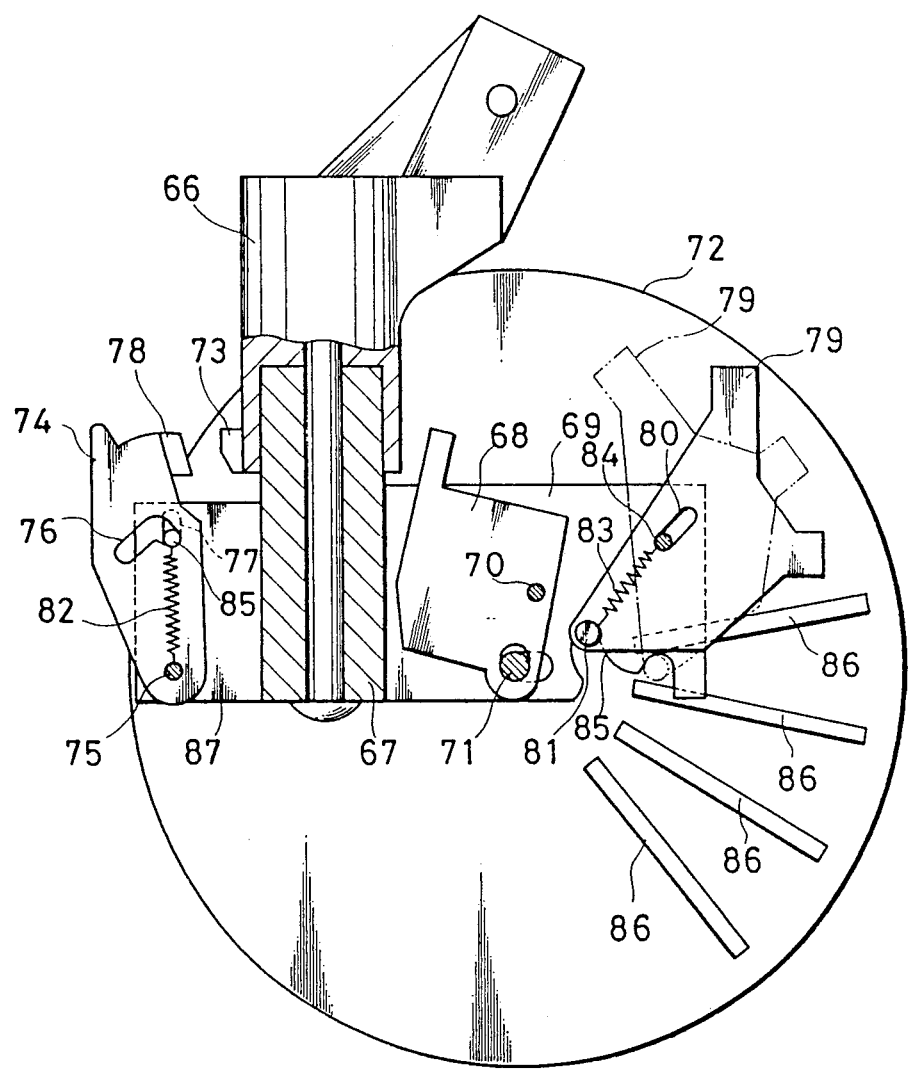
FIG. 18 is a front view, in section, of another embodiment of a caster according to the invention.

FIG. 18 is a front view, in section, of still another embodiment. The illustrated caster, unlike the preceding embodiments, has a manual locking member 74 and a brake member 79 in addition to an automatic locking member 68.

A rotary yoke 67 rotatably held by a fixed bracket 66 has a rearwardly projection wall 69 and a forwardly projecting wall 87. One projecting wall 69 has an automatic locking member 68 turnably attached thereto by a pin 70. The automatic locking member 68 is adapted to turn in response to horizontal movement of an axle 71 supporting a wheel 72. Further, the fixed bracket 66 has an engaging recess 73 engageable by the automatic locking member 68. A description of the operative relationship between the illustrated automatic locking member 68 and the engaging recess 73 is omitted since it is the same as that in the embodiment described with reference to FIGS. 6 to 13.

The other projecting wall 87 of the rotary yoke 67 has the manual locking member 74 pivotally attached thereto by a journal pin 75. The manual locking member 74 is switched between two positions by being operated by hand or by foot. In one position member 74 engages the fixed bracket 66 to inhibit the rotation of the rotary yoke 67. This will now be described in more detail. The manual locking member 74 has an inverted V-shaped guide grove 76. The projecting wall 87 pivotally supporting said manual locking member 74, has a vertical elongated opening 77. As shown, a pin 85 extends through the guide groove 76 and through the elongated opening 77. A spring 82 is installed between the pins 85 and 75, constantly urging the pin 85 downward. In the illustrated state, the manual locking member 74 is not engaged with the fixed bracket 66. When the manual locking member 74 is turned clockwise in the figure from this state by hand or by foot, the pin 85 comes to be positioned at the left-hand end of the guide groove 76. At this time, the front end 78 of the manual locking member 74 engages the recess 73 of the fixed bracket 66. Thus, the rotary yoke 67 is inhibited form rotating.

When the baby carriage is operated for travel, for example, on a bad road, the manual locking member 74 is operated to lock the caster.

The brake member 79 is switched between two positions by being operated by hand or by foot. In one position, the member 79 engages the wheel 72 to inhibit its rotation. As shown, the brake member 79 has an elongated opening 80. Further, the front end of the brake member 79 has rigidly attached thereto a pin 81 extending parallel to the axle 71. A pin 84 is positioned in the elongated opening 80 in the brake member 79. The pin 84 is rigidly attached to the projecting wall 69 of the rotary yoke 67.

To switch the brake member 79 between two positions, the projecting wall 69 has a guide groove 85 engageable by the pin 81. A spring 83 is installed between the pin 81 rigidly secured to the front end portion of the brake member 79, and the pin 84, thereby ensuring a firm engagement between the pin 81 and the guide groove 85.

In the illustrated state, the brake member 79 is not inhibiting the rotation of the wheel 72. When the brake member 79 is turned counterclockwise from the illustrated state by hand or by foot, the pin 81 on the brake member 79 fits between two spokes 86 of the wheel 72, as shown in phantom lines, thereby inhibiting the rotation of the wheel 72.

As described above, the provision of the brake member 79 on the caster makes it unnecessary to provide the baby carriage with separate means for inhibiting the rotation of the wheel; thus, the utility of the baby carriage is enhanced.

As for the manual locking member 74 and the brake member 79, they are not limited to the illustrated constructions but other various forms may be contemplated.

Though not shown, a caster which is the same as the embodiment shown in FIG. 18 except that the brake member 79 is omitted or a caster which is the same as the embodiment shown in FIG. 18 except that the manual locking member 74 is omitted may be contemplated.

Figure 19:
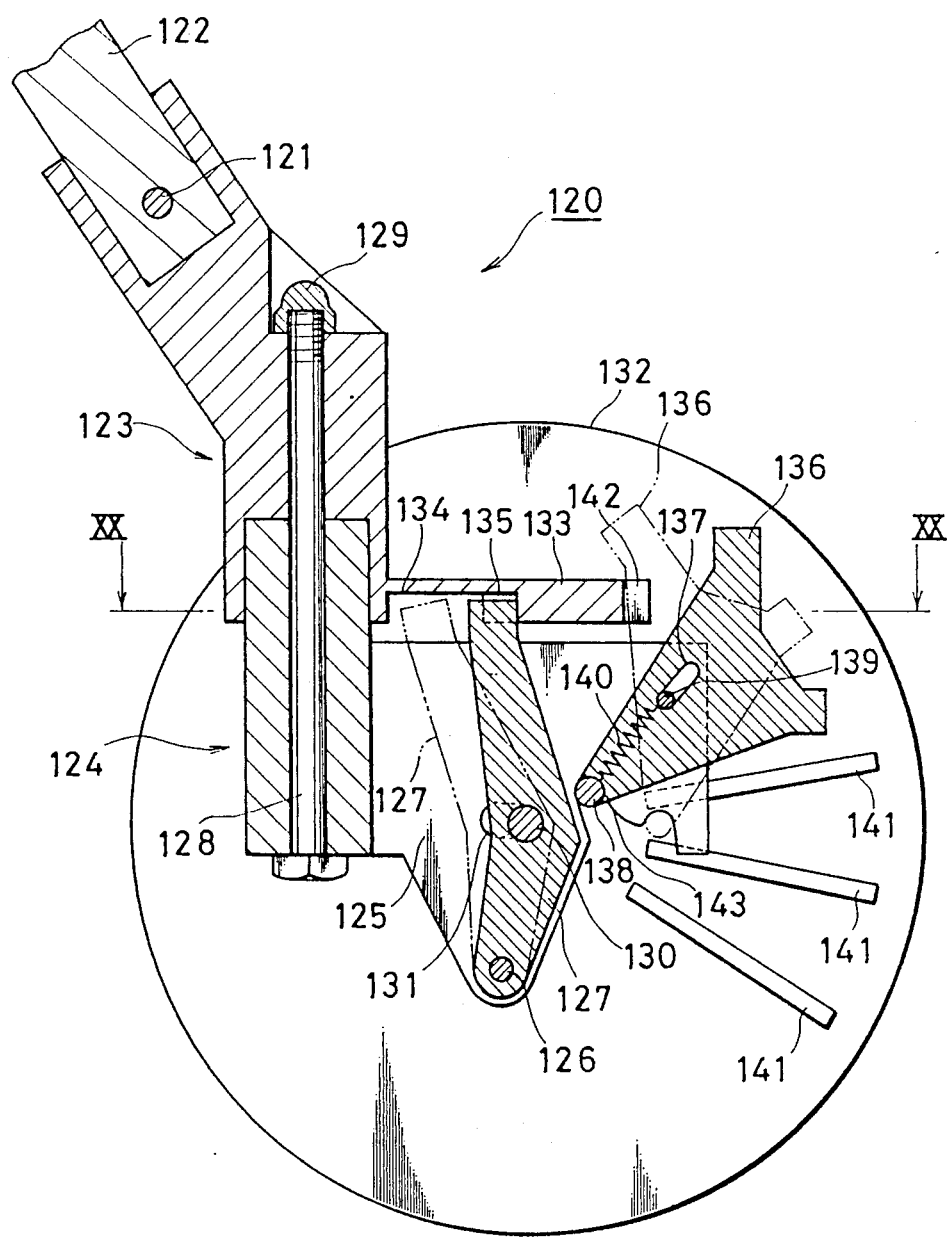
FIG. 19 is a front view, in section, of still another embodiment of a caster according to the invention.

FIG. 19 is a front view, in section, of another embodiment according to the invention attached to a rear leg of a baby carriage. A caster 120 comprises a fixed bracket 123 fixedly attached at its upper end to a rear leg 122 of a baby carriage by a pin 121, a rotary yoke 124 rotatably supported by said fixed bracket 123, and a wheel 132 rotatably supported on the rotary yoke 124 by a horizontal axle 130. A support shaft 128 extends vertically through the rotary yoke 124 and fixed bracket 123. A nut 129 is threadedly attached to the upper end of said support shaft 128, thereby preventing the support shaft 128 from slipping off. Thus, the rotary yoke 124, held on the support shaft 128, is allowed to turn relative to the fixed bracket 123.

The rotary yoke 124 has a pair of projecting walls 125 extending rearward. An automatic locking member 127 is journalled between said pair of projecting walls 125 by a journal pin 126. The axle 130 supporting the wheel 132 extends centrally through the automatic locking member 127. Each of the pair of projecting walls 125 of the rotary yoke 124 has an elongated opening 131 extending horizontally toward the rotational axis of the rotary yoke 124. The axle 130 is held in the elongated opening 131 and movable horizontally therein. In the state shown in FIG. 19, the axle 130 is positioned relatively remote from the rotational axis of the rotary yoke 124. When the axle 130 is moved horizontally from the state shown in FIG. 19 until it is positioned relatively close to the rotational axis of the rotary yoke 124, the automatic locking member 127 is turned around the axis of the pin 126. The state established after the automatic locking member 127 has turned, is shown in phantom lines.

Further, as shown, the fixed bracket 123 has rearwardly extending rear extension 133 having a notch 134 to avoid contact with the automatic locking member 127 when the latter is in the position shown in phantom lines in FIG. 19. Therefore, when the automatic locking member 127 is in the phantom line position, there is no possibility of the rotation of the rotary yoke 124 being interfered with by the presence of the rear extension 133.

Figure 20:
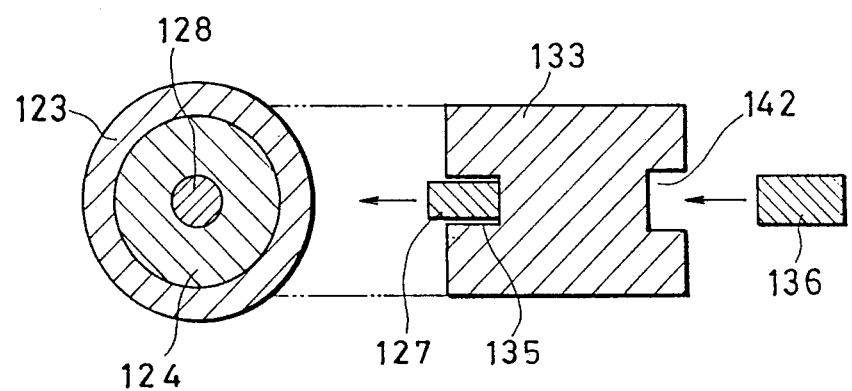
FIG. 20 is an end view taken along the line XX—XX in FIG. 19.

FIG. 20 is an end view taken along the line XX—XX in FIG. 19. As shown, the rear extension 133 of the fixed bracket 123 has a recess 135 engageable with the upper portion of the automatic locking member 127. As shown in FIGS. 19 and 20, when the upper portion of the automatic locking member 127 is engaged in the recess 135 of the fixed bracket 123, the rotation of the rotary yoke 124 relative to the fixed bracket 123 is inhibited.

Referring to FIGS. 19, 2 and 3, the operation of the caster 120 will now be described.

First, suppose that the baby carriage is being operated for travel in a back-to-face push mode as shown in FIG. 2. In this case, the axle 130 of the wheel 132 is positioned relatively remote from the rotational axis of the rotary yoke 124. Further, the upper portion of the automatic locking member 127 is received in the recess 135. Therefore, the caster 120 is locked and thereby inhibited from swiveling.

In this manner, when the baby carriage is operated for travel in a back-to-face push mode, as shown in FIG. 2, the caster 120 for the rear wheel is inhibited from swiveling, whereby, the baby carriage is stabilized for travel on a rough surface.

Next, as shown in FIG. 3, suppose that the push rod is switched to a face-to-face push mode and that the baby carriage is slightly moved forward. Since the caster 120 has been locked, it cannot swivel during the initial stage of the slight forward movement of the baby carriage. Therefore, the axle 130 is moved horizontally to a position relatively close to the rotational axis of the rotary yoke 124. This movement of the axle 130 causes the automatic locking member 127 to turn counterclockwise as shown in phantom lines. As a result, the state of engagement between the automatic locking member 127 and the recess 135 of the fixed bracket 123, is canceled and so is the locked state of the caster 120. Thereafter, the rotary yoke 124 swivels through 180° until the axle 130 of the rear wheel 132 is positioned rearwardly of the rotational axis of the caster 120 as viewed in the direction of travel. In this state, since the automatic locking member 127 is not engaged with the fixed bracket 123, the caster 120 is allowed to swivel.

Thus, it is seen that when the baby carriage is in a back-to-face push mode as shown in FIG. 2, the caster 120 attached to a rear leg of the baby carriage is inhibited from swiveling, while when it is in a face-to-face push mode, the caster is allowed to swivel.

The illustrated caster 120 has a brake member 136 in addition to the automatic locking member 127. The brake member 136 can be switched between two positions by hand or by foot. In one position the brake member engages the wheel 132 to inhibit its rotation.

As shown, the brake member 136 has an elongated opening 137. A pin 138 extending parallel to the axle 130 is rigidly secured on the front end of the brake member 136. A pin 139 is positioned in the elongated opening 137 in the brake member 136. The pin 139 is rigidly installed between the pair of projecting walls 125 of the rotary yoke 124.

To switch the brake member 136 between two positions, each of the projecting walls 125 has a V-shaped guide groove 143 engageable by the pin 138. Further, as shown, a spring 140 is installed between the pin 138 rigidly secured on the front end portion of the brake member 136 and the pin 139 is rigidly secured on the projecting walls 125, thereby ensuring a reliable engagement between the pin 139 and the guide groove 143.

In the illustrated state, the pin 138 is positioned at the left-hand end of the V-shaped guide groove 143. In this state, the brake member 136 is not inhibiting the rotation of the wheel 132., When the brake member 136 is turned counterclockwise from the illustrated state by hand or by foot, the pin 138 of the brake member 136 is positioned at the right-hand end of the V-shaped guide groove 143, as shown in phantom lines. In this position, the pin 138 fits between two spokes 144 of the wheel 132, thereby inhibiting the rotation of the wheel 132.

Referring to FIG. 20, the rear extension 133 of the fixed bracket 123 has an engaging recess 142 engageable with the brake member 136. The arrangement is such that when the brake member 136 is in the phantom line position shown in FIG. 19, it engages the engaging recess 142. When the brake member 136 is engaging the recess 142, the rotation of the rotary yoke 124 is inhibited, so that the caster 120 cannot swivel. That is, when the brake member 136 is in the phantom line position shown in FIG. 19, it inhibits not only the rotation of the wheel 132 but also the rotation of the rotary yoke 124. Therefore, the baby carriage can be reliably held stopped, a fact which is desirable from the standpoint of safety. In addition, in the illustrated embodiment, only one engaging recess 142 engageable by the brake member 136 is provided. However, a plurality of such engaging recesses may be provided in a circle with the center at the rotational axis of the rotary yoke 124.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A caster comprising: a fixed bracket rigidly attached to an object to be moved on said caster, a rotary yoke supported on said fixed bracket for rotation around a vertical axis, and a wheel rotatably supported on said rotary yoke by a horizontal axle, said rotary yoke having an elongated horizontal opening extending at a right angle to said horizontal axle held in said horizontal opening for a horizontal movement in said horizontal opening, whereby said horizontal axle is mounted for movement in a predetermined range in a horizontal plane in a direction extending at right angles to said horizontal axle, said rotary yoke including an automatic locking member and a journal pin pivoting said automatic locking member to said rotary yoke for pivoting between first and second positions in response to movement of said horizontal axle, said automatic locking member having a vertical elongated hole through which said horizontal axle extends, said fixed bracket comprising rotation inhibiting means for engaging said automatic locking member or said rotary yoke to inhibit rotation of the rotary yoke when said fixed bracket and said rotary yoke are in predetermined positional relationship and when the automatic locking member is in said first position.

2. The caster of claim 1, wherein said fixed bracket has a smoothly curved outer surface, an engaging recess in said curved outer surface in such a position that said recess faces forward or backward as viewed in a travel direction of said caster, said automatic locking member having a means located in contact with said smoothly curved outer surface of said fixed bracket for entering into a locking position in said engaging recess.

3. The caster of claim 1, wherein: said object to be moved is a baby carriage having a push rod switchable between a back-to-face push mode and a face-to-face push mode, said caster being attached to lower ends of a pair of front legs and to lower ends of a pair of rear legs of said baby carriage.

4. A caster comprising: a fixed bracket (66) rigidly attached to an object to be moved on said caster, a rotary yoke (67) supported on said fixed bracket for rotation around a vertical axis, and a wheel (72) rotatably supported on said rotary yoke by a horizontal axle (71), said horizontal axle being adapted to move in a predetermined range in a horizontal plane in a direction which is at right angles to said horizontal axle, said rotary yoke including: a manual locking member (74) adapted to be switched between two positions by being operated by hand or by foot; said locking member engaging in one position said fixed bracket to inhibit the rotation of said rotary yoke, and an automatic locking member (68) adapted to be moved between first and second positions in response to the movement of said horizontal axle, said fixed bracket comprising rotation inhibiting means (73) for engaging said automatic locking member or said rotary yoke to inhibit the rotation of said rotary yoke when said fixed bracket and said rotary yoke are in a predetermined positional relationship and when said automatic locking member is in the first position.

5. The caster of claim 4, wherein said rotation inhibiting means is in the form of a recess (73) for receiving said automatic locking member.

6. The caster of claim 5, wherein said manual locking member (74) is adapted to engage said rotation inhibiting means (73).

7. A caster comprising: a fixed bracket (66) rigidly attached to an object to be moved on said caster, a rotary yoke (67) supported on said fixed bracket for rotation around a vertical axis, and a wheel (72) rotatably supported on said rotary yoke by a horizontal axle (71), said horizontal axle (71) being adapted to move in a predetermined range in a horizontal plane in a direction which is at right angles to said horizontal axle, said rotary yoke including: a brake member (79) adapted to be switched between two positions by being operated by hand or by foot; said brake member engaging in one position said wheel for inhibiting rotation of said wheel, and an automatic locking member (68) adapted to be moved between first and second positions in response to the movement of said horizontal axle, said fixed bracket comprising rotation inhibiting means (73) for engaging said automatic locking member or said rotary yoke to inhibit rotation of said rotary yoke when said fixed bracket and said rotary yoke are in a predetermined positional relationship and when said automatic locking member is in the first position.

8. A caster comprising: a fixed bracket (66) rigidly attached to an object to be moved on said caster, a rotary yoke (67) supported on said fixed bracket for rotation around a vertical axis, and a wheel (72) rotatably supported on said rotary yoke by a horizontal axle (71), said horizontal axle (71) being adapted to move in a predetermined range in a horizontal plane in a direction which is at right angles to said horizontal axle, said rotary yoke including: a manual locking member (74) adapted to be switched between two positions by being operated by hand or by foot, said manual locking member engaging in one position said fixed bracket to inhibit the rotation of said rotary yoke, a brake member (79) adapted to be switched between two positions by being operated by hand or by foot; said brake member engaging in one position said wheel (72) to inhibit the rotation of said wheel, and an automatic locking member (68)

adapted to be moved between first and second positions in response to the movement of said horizontal axle, said fixed bracket comprising rotation inhibiting means (73) for engaging said automatic locking member or said rotary yoke to inhibit the rotation of said rotary yoke when said fixed bracket and said rotary yoke are in predetermined positional relationship and when said automatic locking member is in said first position.

9. A caster comprising: a fixed bracket (123) rigidly attached to an object to be moved on said caster, a rotary yoke (124) supported on said fixed bracket (123) for rotation around a vertical axis, and a wheel (132) rotatably supported on said rotary yoke by a horizontal axle (130), said rotary yoke (124) including an automatic locking member (127) turnably attached at its lower portion thereto by a pin (126) and adapted to be moved between first and second positions, said horizontal axle (130) extending through the central portion of said automatic locking member (127), said rotary yoke (124) having an elongated opening (131) extending horizontally at right angles to said horizontal axle, said horizontal axle (130) being held in said elongated opening for horizontal movement therein, said fixed bracket having a recess (135) for engaging an upper portion of said automatic locking member to inhibit the rotation of said rotary yoke when said fixed bracket and said rotary yoke are in a predetermined positional relationship when said automatic locking member is in said first position.

* * * * *